United States Patent [19]
Allais et al.

[11] 3,892,773
[45] July 1, 1975

[54] 2-PHENYL ETHANOL DERIVATIVES

[75] Inventors: Andre Allais, Les Lilas; Jean Meier, La Varenne Saint-Hilaire; Jacques Dube, Eaubonne, all of France

[73] Assignee: Roussel Uclaf, Paris, France

[22] Filed: May 21, 1973

[21] Appl. No.: 362,172

[30] Foreign Application Priority Data
June 1, 1972 France .............................. 72.19690

[52] U.S. Cl....260/327 TH; 260/295.5 R; 260/345.8; 260/345.9; 424/266; 424/275; 424/283
[51] Int. Cl. ......................... C07d 65/04; C07d 7/04
[58] Field of Search ....... 260/327 TH, 345.8, 345.9, 260/618 D, 488 CD; 424/275, 283, 317, 333, 343

[56] References Cited
UNITED STATES PATENTS
3,452,079  6/1969  Shen .................................. 260/469
3,669,973  6/1972  Borck ............................ 260/293.73
FOREIGN PATENTS OR APPLICATIONS
2,054,501  4/1971  France

*Primary Examiner*—Henry R. Jiles
*Assistant Examiner*—C. M. S. Jaisle
*Attorney, Agent, or Firm*—Hammond & Littell

[57] ABSTRACT

Novel 2-phenyl ethanol derivatives of the formula

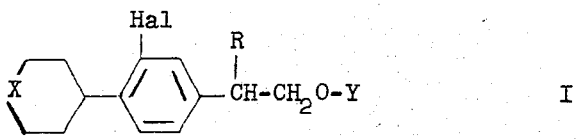

wherein X is selected from the group consisting of oxygen and sulfur, Hal is halogen, R is selected from the group consisting of hydrogen and alkyl of 1 to 4 carbon atoms and Y is selected from the group consisting of hydrogen and acyl of an organic carboxylic acid of 1 to 18 carbon atoms and when R is alkyl, they exist in the form of racemates or optically active isomers having analgesic and anti-inflammatory activity.

6 Claims, No Drawings

2-PHENYL ETHANOL DERIVATIVES

OBJECTS OF THE INVENTION

It is an object of the invention to provide the novel 2-phenyl-ethanol derivatives of formula I.

It is another object of the invention to provide a novel process for the preparation of the compounds of formula I.

It is an additional object of the invention to provide novel analgesic and anti-inflammatory compositions and to provide a novel method of relieving pain and inflammation in warm-blooded animals.

These and other objects and advantages of the invention will become obvious from the following detailed description.

THE INVENTION

The novel 2-phenyl-ethanols of the invention have the formula

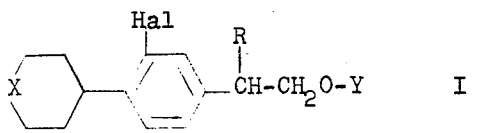

wherein X is selected from the group consisting of oxygen and sulfur, Hal is halogen, R is selected from the group consisting of hydrogen and alkyl of 1 to 4 carbon atoms and Y is selected from the group consisting of hydrogen and acyl of an organic carboxylic acid of 1 to 18 carbon atoms and when R is alkyl, they exist in the form of racemates or optically active isomers.

Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelargonic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-keto-alkanoic acids such as acetylacetic acid, propionylacetic acid and butrylacetic acid; amino acids such as diethylaminoacetic acid and aspartic acid.

Among the preferred compounds of formula I, R is ethyl or propyl, most preferably methyl; Hal is fluorine or bromine and most preferably chlorine; and Y is hydrogen or lower alkanoic acids such as formic, acetic, propionic, butyric or isobutyric acids.

The novel process of the invention for the preparation of the compounds of formula I comprises reacting a compound of the formula

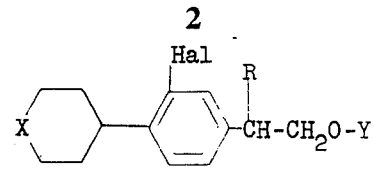

wherein X, R and Hal have the above definitions and Z is selected from the group consisting of hydrogen and alkyl of 1 to 5 carbon atoms with a reducing agent to form the corresponding alcohol of formula I wherein Y is hydrogen and if desired the alcohol is esterified to form the corresponding ester.

The preferred reducing agents are lithium aluminum hydride or diborane and the preferred esterification are the acid chloride or acid anhydride of the acid Y-OH and the reaction is effected in the presence of a tertiary base such as pyridine.

The acids and lower alkyl esters of formula II may be prepared by the process described in Belgium Pat. No. 753,539. When R is alkyl of 1 to 4 carbon atoms, the compounds of formula II may be in the form of racemates or optically active isomers obtained by resolving the acid of formula II with an optically active base by known means. This produces the corresponding racemates or optically active isomers of formula I.

The analgesic and anti-inflammatory compositions of the invention are comprised of a compound of formula I and a pharmaceutical carrier. The compositions may be in the form of injectable solutions or suspensions, tablets, capsules, gelules, drinkable solutions or suspensions, suppositories, pomades, creams or topical powders prepared in the usual fashion.

The compositions may be used in therapy for the treatment of inflammatory maladies such as rhumatismal affections, arthroses, lumbago, zoster and also as a complemetary treatment for infections and feverish states as well as the treatment of muscular, articular or nervous pain, tooth aches and migraines.

The novel method of relieving pain and inflammation in warm-blooded animals comprises administering to warm-blooded animals an effective amount of at least one compound of formula I. The compounds may be administered orally, parenterally or rectally or topically to the skin or mucous membranes. The usual daily dose is 0,4 to 4 mg/kg depending upon the product and method of administration.

In the following examples there are described several preferred embodiments to illustrate the invention. However, it should be understood that the invention is not intended to be limited to the specific embodiments.

EXAMPLE 1

2-methyl-2-[4'-(4''-tetrahydropyranyl)-3'-chloro-phenyl]-ethanol

A mixture of 2.4 g of lithium aluminum hydride in 20 ml of tetrahydrofuran was heated to reflux and then, a solution of 2.4 g of 2-methyl-2-[4'-(4''-tetrahydropyranyl)-3'-chloro-phenyl]-acetic acid (prepared as in Belgium Pat. No. 753,539) in 20 ml of tetrahydrofuran was added dropwise. The mixture was stirred for 2 hours and then cooled. 25 ml of isopropanol and 20 ml of an aqueous solution saturated with ammonium chloride were slowly added thereto and the mixture was filtered. The filtrate was decanted to recover the organic phase which was washed with water until the wash water was neutral. The organic phase was evaporated to dryness under reduced pressure to obtain an 82 percent yield of 2-methyl-2-[4'-(4''-tetrahydropyranyl)-3'-chloro-phenyl]-ethanol which was soluble in the usual organic solvents and insoluble in water.

Analysis: $C_{14}H_{19}ClO_2$; molecular weight = 254.75
Calculated:  %C 66    %H 7.51   %Cl 13.9   %O 12.56
Found:          66      7.2       13.9       12.8

The IR spectrum was in accord with the indicated structure.

EXAMPLE 2

Acetate of 2-methyl-2-[4'-(4''-tetrahydropyranyl)-3'-chlorophenyl]-ethanol 3 ml of acetyl chloride were added dropwise to a mixture of 7.05 g of the product of Example 1 in 21 ml of pyridine cooled to 0°C and the mixture was stirred for one hour at room temperature. The excess acetyl chloride was destroyed by the addition of chopped ice and the mixture was then poured into a solution of 23 ml of concentrated hydrochloric acid in 200 ml of water and ice. The mixture was extracted with ethyl ether and the ether extracts were washed with water until the wash waters were neutral and evaporated to dryness under reduced pressure. The residue was purified by chromatography over silica gel and with a 7:3 chloroformethyl acetate eluant and evaporation of the solvent resulted in a 63 percent yield of the acetate of 2-methyl-2-[4'-(4''-tetrahydropyranyl)-3'-chloro-phenyl]-ethanol.

Analysis: $C_{16}H_{22}ClO_3$; molecular weight = 297.80
Calculated:   %C 64.53   %H 7.44   %Cl 11.9
Found:           64.7      7.1       11.7

The IR spectrum is in accord with the indicated structure.

EXAMPLE 3

2-methyl-2-[4'-(4''-tetrahydrothiapyranyl)-3'-chlorophenyl]ethanol

A solution of 1.93 g of 2-methyl-2-[4'-(4''-tetrahydrothiapyranyl)-3'-chloro-phenyl]-acetic acid in 90 ml of tetrahydrofuran was added with stirring to a refluxing mixture of 1.75 g of lithium aluminum hydride in 70 ml of tetrahydrofuran and after 10 minutes of reflux, another 1.75 g of lithium aluminum hydride were added. Reflux was continued for 20 minutes and the mixture was then cooled to about 0°C.

A mixture of 125 ml of 5 N hydrochloric acid and 100 g of ice was added with stirring followed by 80 ml of ethyl ether and then sufficient sodium chloride for saturation. The organic phase was decanted and the aqueous phase was extracted with ethyl ether. The combined organic phases were evaporated to dryness under reduced pressure and the residue was purified by chromatography over silica gel. The eluant was a 3-2 mixture of chloroform-acetone and evaporation of the solvents gave a 75 percent yield of 2-methyl-2-[4'-(4''-tetrahydrothiapyranyl)-3'-chloro-phenyl]-ethanol which was insoluble in water and soluble in the usual organic solvents.

Analysis: $C_{14}H_{19}ClOS$; molecular weight = 270.78
              %C      %H     %Cl     %S
Calculated:  62.09   7.07   13.09   11.84
Found:       62.1    7.2    13.3    11.4

The IR spectrum and the mass spectrum agreed with the indicated structure.

PHARMACOLOGICAL STUDY

A. Anti-inflammatory Activity

The anti-inflammatory activity was determined by the test of Jequier et al [Arch. Int. Pharmacodyn, Vol. 152 (1954), p. 15] with groups of rats weighing about 150 g receiving a single injection of 1 mg of naphthoyl-heparamine in the plantar aponeurosis of the hind paw to provoke formation of inflammatory edema. The test products were orally administered in an aqueous suspension one hour before the irritant injection and the volume of the paw was measured immediately before the injection and 2 hours later. The increase in paw volume represents a measure of the degree of inflammation. The dose that reduced the degree of inflammation by 40 percent of the controls was determined and is reported in Table I as $DA_{40}$.

B. Analgesic Activity

The test used was based on the fact noted by R. Koster et al [Fed. Proc., (1959), Vol. 18, Page 412] wherein the intraperitoneal injection of acetic acid causes in mice characteristic repeated stretching and twisting movements which can persist for more than 6 hours. Analgesics prevent or surpress this syndrome which, therefore, can be considered as externalization of a diffuse abdominal pain.

A solution of 0.6 percent of acetic acid in water containing 10 percent arabic gum was used and the dose which released the syndrome under these conditions was 0.01 ml/gm, that is 60 mg/kg of acetic acid. The test compounds were administered orally ½ hour before the intraperitoneal injection of acetic acid, the mice having fasted since the night before the experiment. For each dose and for each control, which are obligatory for each test, a group of 5 animals was used. For each mouse, the stretchings were observed and counted and then added for the group of 5 during a period of 15 minutes starting immediately after the injection of acetic acid. The results in the following Table are given as the dose which reduces by 50 percent the number of stretching as compared to the controls ($DA_{50}$).

TABLE I

| Compound of Example | $DA_{40}$ mg/kg | $DA_{50}$ mg/kg |
|---|---|---|
| 1 | 0.05 | 20 |
| 2 | 12 | 20 |
| 3 | 0.065 | 8 |

The data of Table 1 shows that the compounds have anti-inflammatory and analgesic activity with the products of Examples 1 and 3 having a particularly remarkable anti-inflammatory activity.

We claim:
1. A compound of the formula

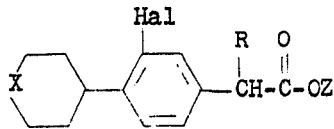
II wherein X is selected from the group consisting of oxygen and sulfur, Hal is halogen, R is selected from the group consisting of hydrogen and alkyl of 1 to 4 carbon atoms and Y is selected from the group consisting of hydrogen and acyl of a lower alkanoic acid and when R is alkyl, they exist in the form of racemates or optically active isomers.

2. A compound of claim 1 wherein R is methyl.
3. A compound of claim 1 wherein Hal is chlorine.
4. A compound of claim 1 which is 2-methyl-2-[4'-(4''-tetrahydropyranyl)-3'-chloro-phenyl]-ethanol.
5. A compound of claim 1 which is the acetate of 2-methyl-2-[4'-(4''-tetrahydropyranyl)-3'-chloro-phenyl]-ethanol.
6. A compound of claim 1 which is 2-methyl-2-[4'-(4''-tetrahydrothiapyranyl)-3'-chloro-phenyl]-ethanol.

* * * * *

UNITED STATES PATENT OFFICE
CERTIFICATE OF CORRECTION

Patent No. 3,892,773          Dated   July 1, 1975

Inventor(s) ANDRE ALLAIS, JEAN MEIER AND JACQUES DUBE

It is certified that error appears in the above-identified patent and that said Letters Patent are hereby corrected as shown below:

Col.   Line
2      5           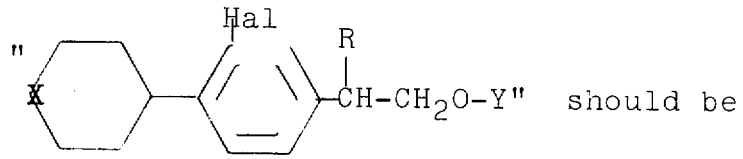  should be

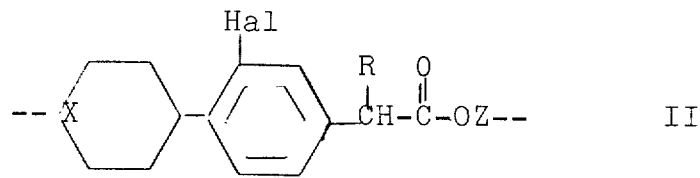      II

5
Claim 1            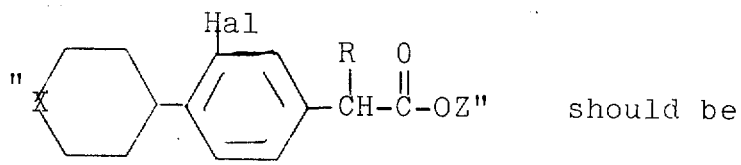  should be

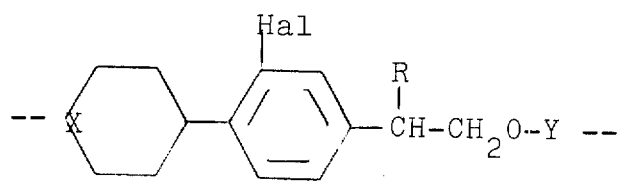

Signed and Sealed this second Day of December 1975

[SEAL]

Attest:

RUTH C. MASON
*Attesting Officer*

C. MARSHALL DANN
*Commissioner of Patents and Trademarks*